United States Patent
Bondarenko et al.

(10) Patent No.: US 12,045,618 B2
(45) Date of Patent: Jul. 23, 2024

(54) DATA PROCESSING APPARATUS AND METHOD FOR GENERATING PREFETCHES BASED ON A NESTED PREFETCH PATTERN

(71) Applicant: Arm Limited, Cambridge (GB)

(72) Inventors: Natalya Bondarenko, Antibes (FR); Stefano Ghiggini, Antibes (FR); Geoffray Matthieu Lacourba, Nice (FR); Cédric Denis Robert Airaud, Saint Laurent du Var (FR)

(73) Assignee: Arm Limited, Cambridge (GB)

( * ) Notice: Subject to any disclaimer, the term of this patent is extended or adjusted under 35 U.S.C. 154(b) by 228 days.

(21) Appl. No.: 17/209,515

(22) Filed: Mar. 23, 2021

(65) Prior Publication Data
US 2022/0308880 A1    Sep. 29, 2022

(51) Int. Cl.
*G06F 9/38* (2018.01)
*G06N 20/00* (2019.01)

(52) U.S. Cl.
CPC ............ *G06F 9/3802* (2013.01); *G06F 9/383* (2013.01); *G06N 20/00* (2019.01)

(58) Field of Classification Search
CPC ...................................................... G06F 9/383
See application file for complete search history.

(56) References Cited

U.S. PATENT DOCUMENTS

| | | | | |
|---|---|---|---|---|
| 6,148,439 A | * | 11/2000 | Nishiyama | G06F 8/4442 717/160 |
| 10,031,851 B2 | | 7/2018 | Sundaram et al. | |
| 10,769,070 B2 | * | 9/2020 | Pusdesris | G06F 12/0862 |
| 2010/0250854 A1 | * | 9/2010 | Ju | G06F 9/383 712/241 |
| 2015/0134933 A1 | * | 5/2015 | Holm | G06F 9/383 712/207 |
| 2016/0054997 A1 | * | 2/2016 | Radhakrishnan | G06F 12/0862 711/137 |

(Continued)

OTHER PUBLICATIONS

B. Grayson et al., "Evolution of the Samsung Exynos CPU Microarchitecture", 2020 ACM/IEEE 47th Annual International Symposium on Computer Architecture (ISCA), May 30-Jun. 3, 2020, pp. 40-51.

(Continued)

*Primary Examiner* — Jacob Petranek
(74) *Attorney, Agent, or Firm* — NIXON & VANDERHYE P.C.

(57) ABSTRACT

The invention provides a data processing apparatus and a data processing method for generating prefetches of data for use during execution of instructions by processing circuitry. The prefetches that are generated are based on a nested prefetch pattern. The nested prefetch pattern comprises a first pattern and a second pattern. The first pattern is defined by a first address offset between sequentially accessed addresses and a first observed number of the sequentially accessed addresses separated by the first address offset. The second pattern is defined by a second address offset between sequential iterations of the first pattern and a second observed number of the sequential iterations of the first pattern separated by the second address offset.

20 Claims, 8 Drawing Sheets

(56) References Cited

U.S. PATENT DOCUMENTS

2017/0010970 A1* 1/2017 Chou ................. G06F 12/0862
2018/0329822 A1* 11/2018 Brekelbaum ............ G06F 3/06

OTHER PUBLICATIONS

S. Iacobovici, "Effective Stream-Based and Execution-Based Data Prefetching", ICS'04, Jun. 26-Jul. 1, 2004, pp. 1-11.
J. Smith et al., "Implementation of Precise Interrupts in Pipelined Processors", IEEE, Jun. 1985, pp. 36-44.

* cited by examiner

DATA PROCESSING APPARATUS AND METHOD FOR GENERATING PREFETCHES BASED ON A NESTED PREFETCH PATTERN

TECHNICAL FIELD

The present invention relates to data processing. More particularly the present invention relates to prefetch generation.

BACKGROUND

Some data processing apparatuses are provided with prefetch generation circuitry to generate prefetches of data for use during execution of instructions. Prefetch generation circuitry may use an observed offset observed between the addresses of sequential data accesses to generate prefetches based on the observed offset. Such observed sequences can be used to successfully predict the addresses of data required when the pattern of the sequential data accesses continues to be based on the observed offset. However, where data access patterns are not continually based on the observed offset, the prefetches generated by the prefetch generation sequence may not be useful.

SUMMARY

In some example configurations described herein there is a data processing apparatus comprising: prefetch generation circuitry to generate prefetches of data for use during execution of instructions by processing circuitry, wherein the prefetch generation circuitry is adapted to generate the prefetches based on a nested prefetch pattern comprising: a first pattern defined by a first address offset between sequentially accessed addresses and a first observed number of the sequentially accessed addresses separated by the first address offset; and a second pattern defined by a second address offset between sequential iterations of the first pattern and a second observed number of the sequential iterations of the first pattern separated by the second address offset.

In some example configurations described herein there is a data processing method comprising: generating prefetches of data for use during execution of instructions by processing circuitry, wherein the prefetches are based on a nested prefetch pattern comprising: a first pattern defined by a first address offset between sequentially accessed addresses and a first observed number of the sequentially accessed addresses separated by the first address offset; and a second pattern defined by a second address offset between sequential iterations of the first pattern and a second observed number of the sequential iterations of the first pattern separated by the second address offset.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
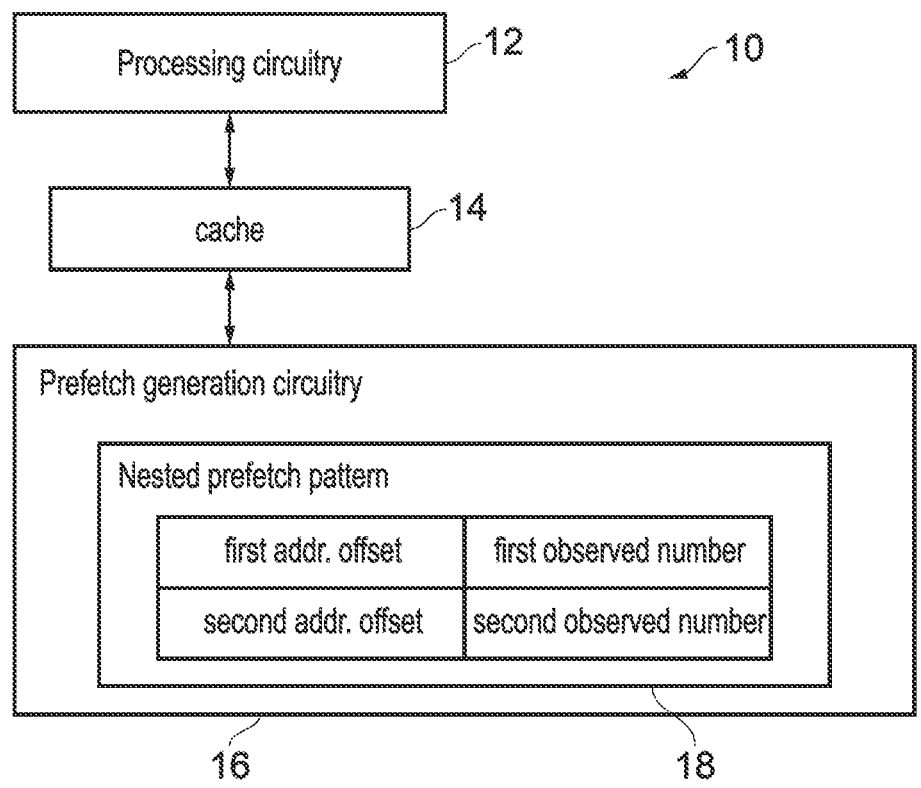
FIG. 1 schematically illustrates a data processing apparatus according to some example configurations.

Before discussing the embodiments with reference to the accompanying figures, the following description of embodiments is provided.

In accordance with some example configurations there is provided a data processing apparatus comprising prefetch generation circuitry to generate prefetches of data for use during execution of instructions by processing circuitry. The prefetch generation circuitry is adapted to generate the prefetches based on a nested prefetch pattern. The nested prefetch pattern comprises a first pattern defined by a first address offset between sequentially accessed addresses and a first observed number of the sequentially accessed addresses separated by the first address offset. The nested prefetch pattern further comprises a second pattern defined by a second address offset between sequential iterations of the first pattern and a second observed number of the sequential iterations of the first pattern separated by the second address offset.

The nested prefetch pattern tracks a sequence of data accesses using the first prefetch pattern and the second prefetch pattern and is used for generating prefetches of data items that are expected to be needed based on these patterns. The first prefetch pattern defines a sequence of prefetch addresses using a first address offset and a first observed number. The first address offset defines an address difference between sequential prefetches within the first prefetch pattern. The first observed number defines a number of sequentially accessed addresses which are separated by the first address offset. The inventors have realised that some data accesses patterns cannot be completely described using only a single address offset and that hierarchical or nested patterns of data accesses can often be used. Hence, the data processing apparatus is configured to store, as part of the nested prefetch patter, a second pattern. The second pattern describes a sequence of occurrences of the first prefetch pattern using a second observed number and a second address offset. The second address offset defines an address difference between occurrences of the first prefetch pattern, and the second observed number defines a number of sequential occurrences of the first prefetch pattern. Hence, the first prefetch pattern defines an inner pattern of prefetches and the second prefetch pattern defines an outer pattern of prefetches. The first and second offset can be defined in a variety of ways, for example, a number of bits or bytes by which sequential addresses are different. The first and second observed numbers can be stored as any indication regarding a number of occurrences of sequential accessed addresses separated by the respective first or second address offset. For example, the first and second observed numbers could be a number of accesses or a number of occurrences of the offset (i.e. the number of sequentially accessed addresses minus 1).

In accordance with some example configurations the prefetch generation circuitry is adapted to, when generating prefetches according to the second pattern, sequentially generate groups of prefetches, each group of prefetches generated according to the first pattern; and for each sequential pair of groups of prefetches comprising a sequentially first group of prefetches and a sequentially second group of prefetches, a sequentially final prefetch address of the sequentially first group of prefetches is separated from a sequentially first prefetch address of the sequentially second prefetch group by the second address offset. The prefetch generation circuitry generates the sequence of prefetches using the first and second address offsets and the first and second observed numbers stored in the first prefetch pattern and the second prefetch pattern. When generating prefetches according to the first prefetch pattern, the prefetch generation circuitry is able to generate prefetches by sequentially incrementing the prefetch address according to the first address offset. When the first observed number of prefetches have been generated, the prefetch generation circuitry generates the next prefetch address by incrementing the final address of the first prefetch pattern by the second address offset. The next prefetch address then forms the first prefetch of a next occurrence of the first pattern. For example, the first prefetch pattern could define a sequence of 3 occurrences of data accesses, each separated by 1 byte, such that the first address offset is 1 byte and the first observed number is 3. The second prefetch pattern could define a sequence of 5 occurrences of the first prefetch pattern, each separated by 10 bytes, such that the second address offset is 10 and the second observed number is 5. Hence, the sequence of addresses for which prefetches are generated by the nested prefetch pattern starting with address A would be: A, A+1 byte, A+2 bytes, A+12 bytes, A+13 bytes, A+14 bytes, etc. It would be readily apparent to the person of ordinary skill in the art that other address offsets and observed numbers could be stored dependent on the nested prefetch pattern. Nested prefetch patterns defined in this way can be particularly useful for prefetching data corresponding to loads in nested program loops. Referring to the above example prefetch pattern, such a pattern may be generated based on the following pseudo code:

The number of prefetch patterns stored in the nested prefetch pattern is not limited and, in some example configurations, the nested prefetch pattern comprises a plurality of patterns; the second pattern is one of the plurality of patterns; and an $N^{th}$ pattern of the plurality of patterns is defined by an $N^{th}$ address offset between sequential iterations of an $(N-1)^{th}$ pattern of the plurality of patterns, and an $N^{th}$ observed number of the sequential iterations of the $(N-1)^{th}$ pattern separated by the $N^{th}$ address offset. Here N is any positive integer greater than or equal to 2. Hence, N and $N^{th}$ are labels used to refer to each pattern of the plurality of nested patterns. The nested prefetch pattern therefore comprises the first prefetch pattern, which is the deepest (lowest) nested pattern, and the plurality of prefetch patterns. Each of the plurality of nested prefetch patterns (labelled N) defines a number of occurrences of the prefetch pattern that is one level deeper (lower) than itself in the hierarchy of nested prefetch patterns. For example, where the plurality of nested prefetch patterns comprises a third prefetch pattern, the third prefetch pattern would define a third address offset and a third observed number. The third address offset would define an address difference between sequential occurrences of the second prefetch pattern and the third observed number would define how many occurrences of the second prefetch pattern have been observed. In this way the nested prefetch pattern can be used to track several levels of nesting which may, for example, be associated with nested looping structures in program instructions. As with the first and second offset, the $N^{th}$ offset can be defined in a variety of ways, for example, a number of bits or bytes by which sequential addresses are different. Similarly, the $N^{th}$ observed number can be stored as any indication regarding a number of occurrences of sequential accessed addresses separated by the $N^{th}$ address offset. For example, the $N^{th}$ observed number could be a number of accesses or a number of occurrences of the offset (i.e. the number of sequentially accessed addresses minus 1).

When a plurality of patterns are stored in addition to the first prefetch pattern, according to some example configurations the prefetch generation circuitry is adapted to recursively, when generating prefetches according to the $N^{th}$ pattern: sequentially generate groups of the $(N-1)^{th}$ pattern of prefetches, each of the groups of the $(N-1)^{th}$ pattern of prefetches generated according to the $(N-1)^{th}$ pattern; and for each sequential pair of groups of the $(N-1)^{th}$ pattern of prefetches comprising a sequentially first group of the $(N-1)^{th}$ pattern of prefetches and a sequentially second

```
Address=A                                //set base address
First_offset = 1                         //set first offset
Second_offset = 10                       //set second offset
First_observed_number = 3                //set first observed number
Second_observed_number=5                 //set second observed number
for i=1:second_observed_number {
  for i=1:first_observed_number {
    load data from Address               //load data
    //perform other operations based on loaded data
    Address = Address+first_offset       //increment address
  }
  Address = Address+second_offset-first_offset    //increment address
}
```

The above pseudo code generates the address sequence define above. By storing data as a nested prefetch pattern, the prefetch generation circuitry can be provided which prefetches data according to the sequence set out in the pseudo code, thereby providing the data before it is required.

group of the $(N-1)^{th}$ pattern of prefetches, a sequentially final prefetch of the sequentially first group of the $(N-1)^{th}$ pattern of prefetches is separated from a sequentially first prefetch of the sequentially second group of the $(N-1)^{th}$ pattern of prefetches by the $N^{th}$ address offset. The prefetch generation circuitry is able to use the nested prefetch pattern to generate prefetch patterns according to an $N^{th}$ pattern. When the prefetch generation circuitry has completed generating prefetches for the $(N-1)^{th}$ pattern, the prefetch generation circuitry modifies (increments) the address of the final prefetch of the $(N-1)^{th}$ pattern using the $N^{th}$ offset to generate a next prefetch address which is to be used as a first prefetch of the next iteration of the $(N-1)^{th}$ pattern. In this way prefetch can be generated in accordance with the plurality of patterns stored as part of the nested prefetch pattern.

In some example configurations the data processing apparatus further comprises training circuitry adapted to, starting from the first pattern, update each pattern of the nested prefetch pattern based on an observed sequence of address offsets between sequential memory accesses. The training circuitry (also referred to as generation circuitry) is used to capture the observed sequence of address offsets and to update patterns stored as part of the nested prefetch pattern. In some example configurations, when no pattern corresponding to the observed sequence of address offsets has been stored, the training circuitry generates new patterns based on the observed sequence of address offsets. In this way the nested prefetch pattern can be adapted to the observed sequence of address offsets observed by the training circuitry.

According to some example configurations the nested prefetch pattern comprises P patterns; and the nested prefetch pattern encodes status data indicating a training portion of the nested prefetch pattern and a learned portion of the nested prefetch pattern, the training portion comprising the $P^{th}$ pattern of the plurality of nested patterns, and the learned portion comprising patterns 1 to P−1 of the nested prefetch pattern. The label P is any positive integer greater than or equal to 1 and is used to define which pattern of the plurality of patterns is part of the training portion and which (if any) of the plurality of patterns are part of the learned portion. The status data may be encoded in a variety of ways. For example, in some example configurations the training circuitry stores a flag indicative of which patterns are in the training portion. In other example configurations, the status data is encoded in a plurality of observed numbers and a plurality of counter values, and the plurality of observed numbers comprises the first observed number, the second observed number, and the $N^{th}$ observed number. For example, the lowest pattern with a non-set observed number could define the status data from which the training portion can be identified. The counter values determine information indicative of a current number of occurrences of the corresponding address offset in a current iteration of a corresponding pattern, for example the counter values could store the number of occurrences of the corresponding address offset in a current iteration of the corresponding pattern, or a number of occurrences of addresses separated by the corresponding address offset in a current iteration of the corresponding pattern. In this way the counter values can be used to track a current position within the nested prefetch pattern.

In accordance with some example configurations the prefetch generation circuitry is adapted to in parallel: learn the training portion based on the observed sequence of address offsets; and generate prefetches based on the learned portion of the nested prefetch pattern. The prefetch generation circuitry may comprise the training circuitry, or alternatively, the prefetch generation circuitry may be configured to cause the training circuitry to learn the training portion based on the observed sequence of address offsets in parallel to the generation of prefetches based on the learned portion. The nested prefetch pattern may comprise a large number of data accesses. Hence, it is advantageous to generate prefetches based on the nested prefetch pattern in parallel to learning the observed sequence of addresses. For example, where the training portion consists of the $N^{th}$ pattern, prefetches may be generated based on patterns 1 through to N−1 which have already been learned. In addition, in some example configurations the prefetch generation circuitry may be adapted to generate prefetches based on the training portion. Prefetching data based on the training portion may advantageously result in accurate prefetching of data when the data accesses continue according to the training portion.

The training circuitry begins learning the nested prefetch pattern from the first (innermost) pattern and works outwards through the second and, optionally, through the plurality of patterns in the nested prefetch pattern. Hence, in accordance with some example configurations the training circuitry is adapted to, when the training portion is the first pattern: determine a first address difference between a sequential pair of memory accesses, set the first address offset based on the first address difference, and modify a first counter value of the plurality of counter values to indicate an occurrence of the first address difference. The first address difference may be determined in a number of ways. In some example configurations the training circuitry is provided with storage circuitry to store an address of a sequentially previously observed data access. The first address difference can then be determined based on a difference between the stored address (previous address) and an address of a currently observed data access. Modification of the counters can be variously implemented. In some example configurations the counter value is incremented such that the value of the counter corresponds to a number of sequential occurrences of the first address difference. In other example configurations the counter value is incremented or decremented from a fixed value such that the difference between the counter value and the fixed value is the number of sequential occurrences of the first address difference.

Once the first counter value of the first pattern has been initialised a number of occurrences of the first address offset can be counted. In some example configurations the training circuitry is adapted to, when the training portion is the first pattern: determine a second address difference between a second sequential pair of memory accesses; when the second address difference is equal to the first address offset, modify the first counter value to indicate the occurrence of the second address difference; and when the second address difference is different to the first address offset to perform a first pattern update procedure comprising resetting the first counter value. The training circuitry considers all sequential pairs of memory accesses to determine a number of sequential occurrences of the first address offset. The second sequential pair of memory accesses comprises at least one memory access that is different to the first sequential pair of memory accesses. When the second address difference is determined to be the same as the first address offset, it is determined that the sequential memory accesses are progressing as expected. Hence, the occurrence of the second address difference is recorded by modifying the first counter value to indicate the occurrence of the first address offset (equal to the second address difference). If however, the second address difference is not equal to the first address offset then it is determined that the observed sequence of memory accesses can no longer be described by the first pattern alone. Hence, the training circuitry is configured to perform a first pattern update procedure comprising resetting the first counter to indicate that the second address difference between the second sequential pair of memory addresses does not belong to the first pattern.

The pattern update procedure may comprise a number of different steps. In some example configurations the first pattern update procedure further comprises: prior to resetting the first counter value, setting the first observed number of the sequentially accessed addresses to the first counter value; modifying a second counter value of the plurality of counter values to indicate an occurrence of the second address difference; modifying the status data to indicate that the first pattern belongs to the learned portion; and setting the second address offset based on the second address difference. By setting the first observed number to the first counter value, the prefetch generation circuitry is able to track the number of sequential occurrences of the first observed offset. The first pattern update procedure further comprises the steps of initialising the second counter value and the second offset value of the second pattern. In some example configurations the pattern update procedure further comprises resetting the second observed number. In this way the second counter value and the second observed number encode status data indicative that the second pattern is the training portion.

In some example configurations the first pattern update procedure further comprises: determining a third address difference between a third sequential pair of memory accesses; when the third address difference is equal to the first address offset, modifying the first counter value to indicate the occurrence of the third address difference; and when the third address difference is different to the first address offset, setting the first address offset to the third address difference, resetting the plurality of observed numbers, resetting the plurality of observed counter values, modifying the status data to indicate that the first pattern is the training portion, and modifying the first counter value to indicate the occurrence of the third address difference. The first pattern update procedure therefore verifies that the first pattern is a repeating pattern. When the third address difference is equal to the first address offset, it is determined that the nested prefetch pattern is continuing according to the previously observed data accesses. Accordingly the first counter value is incremented to indicate occurrence of the first address offset. If however, the third address difference is not equal to the first address offset, then it is determined that the sequence of data accesses has deviated from the expected nested prefetch pattern and, hence, each of the plurality of observed counter values and each of the plurality of observed numbers are reset. The training circuitry then considers the third address difference as being part of a new innermost pattern of nested data accesses. Hence, the training circuitry sets the first address offset to the third address difference and increments the first counter value. This sequence causes the encoded status data to indicate that the first pattern is the training portion.

In some example configurations the training circuitry further comprises an $N^{th}$ counter value of the plurality of counter values indicative of a number of occurrences of the $N^{th}$ address offset. The inclusion of the $N^{th}$ counter value in the plurality of counter values allows the training circuitry and the prefetch generation circuitry to relate a current data access to a position in the nested prefetch pattern.

In some example configurations the training circuitry is adapted to, when the training portion comprises the $N^{th}$ pattern, determine a fourth address difference between a sequentially final memory access of the $(N-1)^{th}$ pattern and a sequentially next memory access; and when the fourth address difference is equal to the $N^{th}$ address offset, modify the $N^{th}$ counter value to indicate an occurrence of the fourth address difference. The sequentially final memory access of the $(N-1)^{th}$ pattern is identified based on a comparison between all counter values for patterns 1 to $(N-1)$ and the corresponding observed numbers. In particular, the memory access is the sequentially final memory access of the $(N-1)^{th}$ pattern when, for all integer values of j in a range from 1 to $N-1$, the $j^{th}$ counter value is equal to the $j^{th}$ observed number. When the fourth address difference is equal to the $N^{th}$ address offset, it is determined that the $N^{th}$ pattern is still part of the training portion and the $N^{th}$ counter value is incremented accordingly.

In some example configurations the training circuitry is adapted to, when the training portion comprises the $N^{th}$ pattern and when the $N^{th}$ offset is different to the fourth address perform an $N^{th}$ pattern update procedure comprising: setting the $N^{th}$ observed number to the $N^{th}$ counter value; and resetting the $N^{th}$ counter value. When the fourth address difference does not correspond to the $N^{th}$ offset stored as part of the $N^{th}$ pattern, it is determined that the Nth pattern has been observed in its entirety and the $N^{th}$ observed number is set to indicate the observed number of occurrences of the $N^{th}$ address offset.

The number of access patterns which comprise the nested prefetch pattern is not particularly limited. However, in some example configurations the training circuitry is adapted to store $N_{max}$ patterns; and the $N^{th}$ pattern update procedure further comprises, when $N<N_{max}$: setting an $(N+1)^{th}$ address offset based on the fourth address difference; modifying the status data to indicate that the $N^{th}$ pattern belongs to the learned portion; and setting an $(N+1)^{th}$ counter value of the plurality of counter values to indicate an occurrence of the fourth address difference. Here $N_{max}$ is a positive integer defined by the amount of storage provided to store the nested prefetch pattern. When N is greater than or equal to $N_{max}$ there is no space to store further patterns. Hence, all counter values are reset for all patterns. When the sequential data access pattern continues to follow the nested data access pattern, the recorded portion of the data access pattern (patterns 1 to $N_{max}$) will repeat. Hence, the nested prefetch pattern records an inner portion of the total data pattern and can therefore be used to generated prefetches of the inner portion of the nested prefetch pattern.

In some example configurations the $N^{th}$ pattern update procedure further comprises: determining a fifth address difference between the sequentially next memory access and a further sequentially next memory access; when the $N^{th}$ offset is different to the fourth address difference and the fifth address difference is different to the first address difference, setting the first address offset to the fifth address difference, resetting the plurality of observed numbers, resetting the plurality of observed counter values, modifying the status data to indicate that the first pattern is the training portion, and modifying the first counter value to indicate the occurrence of the fifth address difference. As discussed, in some example configurations, the status data comprises a flag indicative of which pattern of the nested prefetch pattern is the training portion. In other example configurations, the status data is encoded through the setting of the plurality of observed numbers. In such example configurations, the modifying of the status data comprises the setting of the $N^{th}$ observed number to the $N^{th}$ counter value.

In some example configurations the training circuitry is adapted to, when the training portion is the $N^{th}$ pattern and when the observed sequence of address offsets between sequential memory accesses deviates from a $M^{th}$ pattern where M<N, modify the status data to indicate that the training portion is the $M^{th}$ pattern. In some example configurations the setting of the status data involves the modification of a flag indicative of which pattern of the nested prefetch pattern is the training portion. In other embodiments, where the status data is encoded in the plurality of observed numbers, the setting of the status data is achieved by resetting (setting to a predefined value, e.g., zero) the observed numbers for all patterns greater than or equal to M. In this way it is possible to track a deviation of the data access pattern from the nested prefetch pattern and to retain a portion of the nested prefetch pattern that has not been shown to deviate from the observed sequence of accesses.

The generation of prefetches, which may occur in parallel to the updating of the nested prefetch pattern by the training circuitry, is tracked within the nested prefetch pattern. Hence, some example configurations further comprise one or more generation counters indicative of a currently issuing prefetch in the nested prefetch pattern. In some example configurations each pattern of the nested prefetch patterns comprises a generation counter such that a next prefetch to be generated by incrementing a current prefetch address by an appropriate offset. The appropriate offset is determined from the lowest prefetch pattern for which the generation counter is different to the corresponding observed number. For example, when a first generation counter associated with the first pattern has a value that is different to the first observed number, it is determined that the next prefetch is generated based on a current prefetch address incremented by the first offset. As an alternative example, when the first generation counter is equal to the first observed number, the second generation counter is equal to the second observed number, and the third generation counter is different to the third observed number the next prefetch is to be generated by incrementing the current prefetch address by the third offset. The generation counters are modified based on the generation of a prefetch. The generation counters can be updated based on any scheme for tracking a currently issuing prefetch in the sequence of prefetches. In some example configurations the generation counters reset to one. When a prefetch address is generated based on an $N^{th}$ address offset, the generation counters for all patterns 1 to N are modified, where the modification of each generation counter comprises: when the generation counter is less than the corresponding observed number, incrementing the generation counter; and when the generation counter is equal to the observed number, resetting the generation counter. It is noted that the generation counters correspond to a currently issuing prefetch and, hence, indicate a position in the nested prefetch pattern that is ahead of the position of a current data access as indicated by the plurality of counter values. Alternatively, a single counter may be provided as a generation counter, the single counter indicative of a difference between a current data access, as indicated by the plurality of counter values and the plurality observed numbers, and a current prefetch being generated. Further variations for providing and maintaining the generation counters will be readily apparent to the person of ordinary skill in the art.

Particular embodiments will now be described with reference to the figures.

FIG. 1 illustrates a data processing apparatus 10 according to various example configurations. In particular, data processing apparatus 10 comprises processing circuitry 12, cache 14 and prefetch generation circuitry 16. The prefetch generation circuitry is adapted to generated prefetches based on a nested prefetch patterns 18. The nested prefetch pattern 18 comprises a first pattern which includes a first address offset and a first observed number. The first address offset corresponds to an address difference between sequentially observed data accesses and the first observed number corresponds to a number of sequential occurrences of the observed data accesses to addresses with an observed address difference equal to the first address offset. The nested prefetch pattern 18 further comprises a second pattern which includes a second address offset and a second observed number. The second address offset corresponds to a difference between sequentially observed sequences of data accesses which follow the first pattern. The second observed number corresponds to a number of sequential occurrences of the sequence of data accesses which follow the first pattern.

The prefetch generation circuitry 16 is further configured to generate prefetches based on the nested prefetch pattern 18. In particular, the prefetch generation circuitry 16 generates groups of sequential prefetches according to the first prefetch pattern. Each group of sequential prefetches contains a number of prefetches equal to the first observed number to addresses which are separated by the first address offset. The number of groups of sequential prefetches that are generated is defined by the second observed number and the address difference between a final prefetch of a sequentially first group of generated prefetches and a sequentially first prefetch of a sequentially second group of generated prefetches is equal to the second address offset. Hence, the prefetch generation circuitry 16 is able to generate prefetches according to the nested prefetch pattern 18. The number of patterns is not limited and the nested prefetch pattern 18 could comprise further patterns corresponding to different layers of nesting within the nested prefetch pattern.

Figure 2:
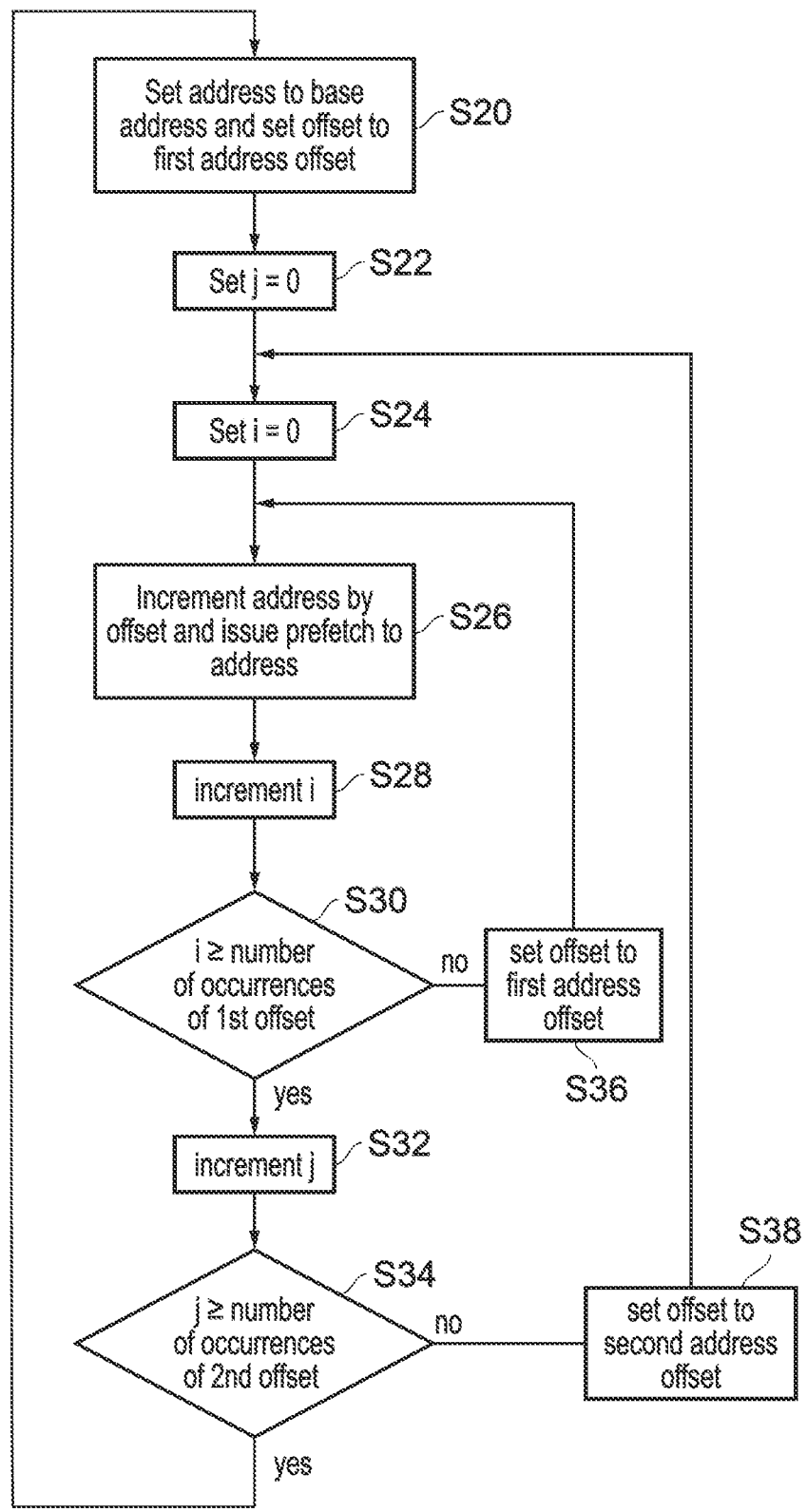
FIG. 2 schematically illustrates a sequence of steps carried out by prefetch generation circuitry according to some example configurations.

FIG. 2 schematically illustrates the principle of prefetch generation carried out by the prefetch generation circuitry 16 when generating prefetches according to a nested prefetch pattern comprising a first pattern and a second pattern. Flow begins at step S20 where a base address is determined and the offset is set to the first address offset. Flow then proceeds to step S22 where variable j is set to 0 and step S24 where variable i is set to 0. Flow then proceeds to step S26 where the address is incremented by the current offset and a prefetch is issued to prefetch data from a location defined by the address. Flow then proceeds to step S28 where i is incremented. Flow then proceeds to step S30, where it is determined if i is greater than or equal to the first number of occurrences of the first offset address. If no then flow proceeds to step S36 where the offset is set to the first address offset before flow returns to step S26. If, at step S36 the offset is already set to the first address offset then no change is made to the offset. If, at step S30, it is determined that i is greater than or equal to the first observed number then it is determined that the first pattern has completed and flow proceeds to step S32 where variable j is incremented and flow proceeds to step S34 where it is determined if j is greater than or equal to the second observed number. If, at step S34 it is determined that j is not greater than or equal to the first number of occurrences then it is determined that the second pattern has not completed and flow proceeds to step S38. At step S38 the offset is set to the second address offset and flow returns to step S24. If at step S34 it is determined that j is greater than or equal to the second observed number, it is determined that the second pattern has completed and flow returns to step S20. It would be understood by the person of ordinary skill in the art that the illustrated sequence of steps is illustrative of the nested way in which prefetches can be generated based on the nested prefetch pattern and that the logic set out in FIG. 2 can be implemented in different manners in accordance with the example configurations described herein. Furthermore, whilst FIG. 2 illustrates the generation of prefetches starting at the beginning of the nested prefetch pattern, the generation of prefetches could start at any point in the nested prefetch pattern.

Figure 3:
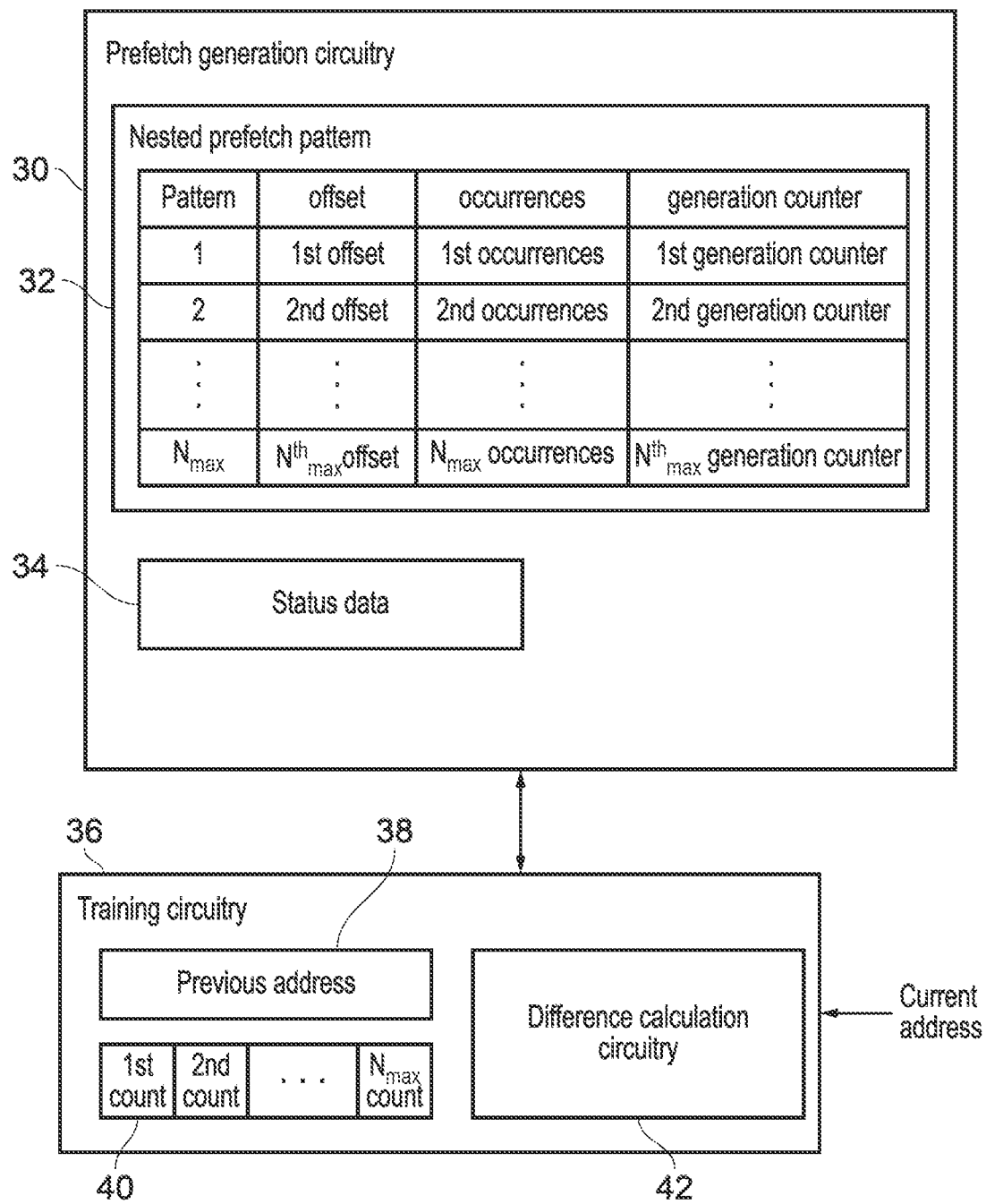
FIG. 3 schematically illustrates prefetch generation circuitry and training circuitry according to some example configurations.

FIG. 3 schematically illustrates prefetch generation circuitry 30 and training circuitry 36 according to some example configurations. The prefetch generation circuitry 30 comprises nested prefetch pattern 32 and status data 34 indicative of a training portion of the nested prefetch pattern 32 and a learned portion of the nested prefetch pattern 32. The nested prefetch pattern 32 comprises a plurality of patterns, each pattern storing an address offset, a number of occurrences and a generation counter. The status data 34 may be stored as separate data or may be encoded within the address offsets and number of occurrences stored in the nested prefetch pattern 32. As discussed, the plurality of address offsets and the plurality of occurrences are used to determine the nested prefetch pattern from which the prefetch generation circuitry 30 generates prefetches. The plurality of generation counters are used to track a current prefetch generated by the prefetch generation circuitry 30.

The training circuitry 36 comprises storage circuitry 38 to store a previous address, a plurality of counters 40 to store a plurality of counter values and difference calculation circuitry 42. In some example configurations the training circuitry 36 may form part of the prefetch generation circuitry 30 or may be provided as an independent logic block. The training circuitry 36 takes, as an input, a current address for a current data access. The difference calculation circuitry 42 determines a difference between the current address and the previous address stored in the storage circuitry 38. The address difference calculated by the difference calculation circuitry 42 is used, in combination with the plurality of counters 40, to track a sequence of data accesses and to update the nested prefetch pattern 32 based on the sequence of data accesses.

By providing separate generation counters as part of the nested prefetch pattern 32 and counters 40 storing counter values as part of the training circuitry 36, the prefetch generation circuitry 30 is able to generate prefetches in parallel to the updating of the nested prefetch pattern 32 by the training circuitry 36.

Figure 4:
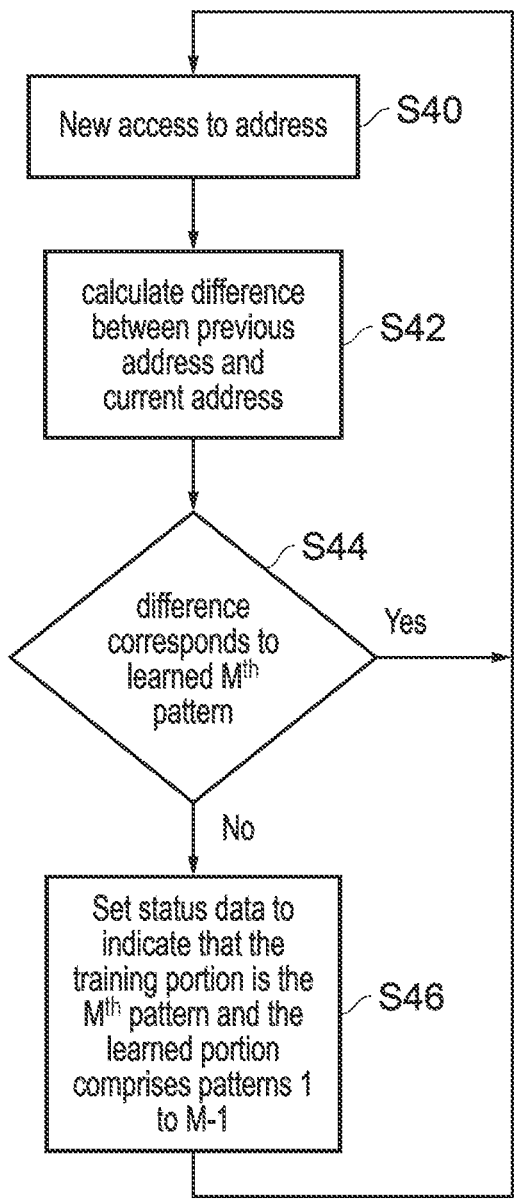
FIG. 4 schematically illustrates a sequence of steps carried out by training circuitry according to some example configurations.

FIG. 4 schematically illustrates a sequence of steps taken by the training circuitry 36 in some example configurations. In particular, the training circuitry 36 tracks a sequence of data accesses and updates the nested prefetch pattern based on the sequence. Where it is determined that the sequence has deviated from the nested prefetch pattern, the training circuitry modifies the nested prefetch pattern to remove incorrect portions of the pattern. Flow begins at step S40, where a new data access is made to an address. Flow then proceeds to step S42, where an address difference is calculated between the address of the new access and a previous address. Flow then proceeds to step S44, where it is determined whether the difference corresponds to the expected difference which would be observed at a current position, which is determined to correspond to an $M^{th}$ pattern, in the nested prefetch pattern. If at step S44 it is determined that the address difference corresponds to the expected difference, then flow returns to step S40. Alternatively, if at step S44 it is determined that the observed difference does not correspond to the expected difference in the identified $M^{th}$ pattern, then flow proceeds to step S46. At step S46 the status data is modified to indicate that the training portion is the $M^{th}$ pattern and the learned portion comprises patterns 1 to M-1. In this way, when an observed access pattern deviates from the nested prefetch pattern, patterns of the nested prefetch pattern, which are deeper nested patterns than the pattern for which the deviation occurred, can be retained within the learned portion and only patterns which are not as deep in the nested prefetch pattern are discarded. Flow then returns to step S40.

Figure 5:
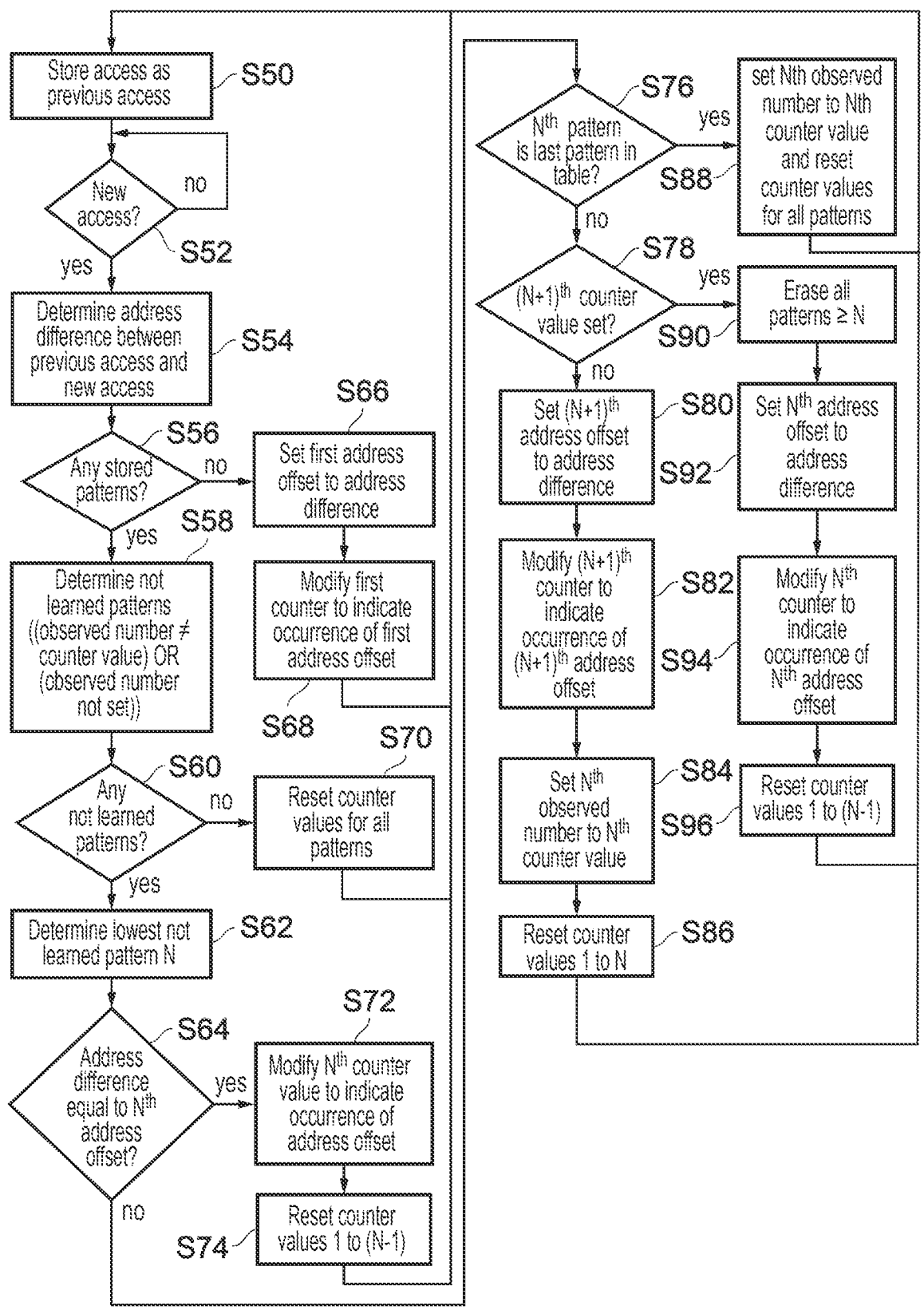
FIG. 5 schematically illustrates a sequence of steps carried out by training circuitry according to some example configurations.

FIG. 5 schematically illustrates a sequence of steps carried out by the training circuitry 36 in some example configurations. Flow begins at step S50 where a data access is stored as a previous data access. Flow then proceeds to step S52 where the training circuitry waits until a new access is detected. When no access is detected flow returns to step S52. When at step S52 it is determined that a new access is detected, flow proceeds to step S54 where the training circuitry determines an address difference between the stored previous access and the new access. Flow then proceeds to step S56, where it is determined if there are any currently stored access patterns. The training circuitry determines if there are stored patterns by determining if any of the patterns of the nested prefetch pattern 32 have an observed number that is greater than zero or if any of the counter values of the plurality of counters 40 are non-zero. If at step S56 it is determined that there are not stored access patterns then flow proceeds to step S66 where the training circuitry sets the first address offset to the address difference. Flow then proceeds to step S68 where the training circuitry modifies the first counter value stored in the plurality of counters 40 to indicate occurrence of the first address offset. Flow then returns to step S50.

If at step S56 it was determined that there were already stored patterns then flow proceeds to step S58. At step S58 it is determined whether any patterns of the nested prefetch pattern are not learned patterns. In this context the not learned patterns are patterns of the nested prefetch pattern 32 that have not been completely observed in a most recent iteration of the corresponding pattern. It is noted that the not learned patterns are defined differently to the learned portion and the training portion. The not learned patterns are therefore patterns of the nested prefetch pattern 32 which may be part of the learned portion (patterns which have been previously observed in their entirety) or of the training portion (the outermost pattern which has not been observed in its entirety). In other words, the not learned patterns are patterns which could potentially be determined to be incorrect if the currently observed address difference does not correspond to the expected address offset. The not learned patterns are defined as any patterns for which either the observed number is not equal to the counter value or the observed number is not set. Flow then proceeds to step S60, where it is determined if there are any not learned patterns. If it is determined that there are no not learned patterns (e.g. each pattern has a set observed number that is equal to the counter value) then flow proceeds to step S70 where all the counter values stored in the plurality of counters 40 are reset.

If however, at step S60, it was determined that 1 or more of the patterns of the nested prefetch pattern 32 are not learned patterns then flow proceeds to step S62. At step S62 it is determined which pattern of the not learned patterns is the lowest (deepest nested) not learned pattern. The lowest not learned pattern is denoted N. The lowest not learned pattern N is the deepest pattern in the nested prefetch pattern 32 for which the corresponding counter value of the plurality of counter values 40 is not equal to the corresponding observed number or for which the corresponding observed number is not yet set. Flow then proceeds to step S64 where it is determined whether the address difference is equal to the $N^{th}$ address offset. If at step S64 it is determined that the address difference is equal to the $N^{th}$ address offset then flow proceeds to step S72 where the $N^{th}$ counter is modified (for example, incremented) to indicate the occurrence of the address offset. Flow then proceeds to step S74 where counter values 1 to (N−1) of the plurality of counters 40 are reset (for example, set to 0). Flow then returns to step S50.

If at step S64 it was determined that the address difference was not equal to the $N^{th}$ address offset then it is determined that the observed sequence of data accesses has deviated from the sequence recorded in the nested prefetch pattern 32 and flow proceeds to step S76. At step S76 it is determined whether the $N^{th}$ pattern is the last pattern that can be stored in the nested prefetch pattern 32. If yes then flow proceeds to step S88 where the $N^{th}$ observed number is set to the $N^{th}$ counter value and all the counter values of the plurality of counters 40 are reset (for example, set to 0). Flow then returns to step S50.

If at step S76 it was determined that the $N^{th}$ pattern was not the last pattern in the table then flow proceeds to step S78 where it is determined if the $(N+1)^{th}$ counter is set. If yes then flow proceeds to step S90 where the training circuitry 36 erases all patterns greater than or equal to N. In some example configurations the patterns are erased by setting the observed numbers and address offsets for patterns greater than or equal to N to a null value or to zero. Flow then proceeds to step S92 where the $N^{th}$ address offset is set to the address difference determined at step S54. Flow then proceeds to step S94 where the $N^{th}$ counter value of the plurality of counters 40 is modified to indicate occurrence of the $N^{th}$ address offset. Flow then proceeds to step S96 where counter values 1 to (N−1) of the plurality of counter values are reset (for example, set to 0). Flow then returns to step S50.

If at step S78 it was determined that the $(N+1)^{th}$ counter value was not set, then flow proceeds to step S80 where the $(N+1)^{th}$ address offset is set to the address difference that was determined at step S54. Flow then proceeds to step S82 where the $(N+1)^{th}$ counter is modified (for example, incremented) to indicate the occurrence of the $(N+1)^{th}$ address offset. Flow then proceeds to step S84 where the $N^{th}$ observed number is set to the $N^{th}$ counter value. Flow then proceeds to step S86 where the counter values of the plurality of counters 40 are reset (for example, set to 0). Flow then returns to step S50.

Figure 6:
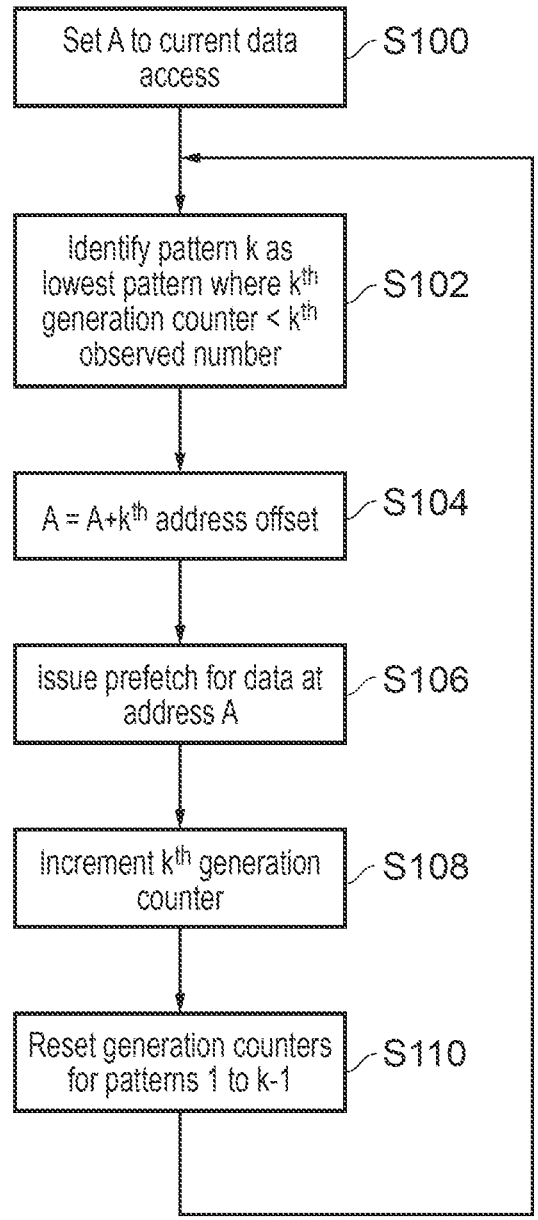
FIG. 6 schematically illustrates a sequence of steps carried out by prefetch generation circuitry according to some example configurations.

FIG. 6 schematically illustrates a sequence of steps taken by the prefetch generation circuitry 30 when generating prefetches from the nested prefetch pattern 32. Flow begins at step S100, where the prefetching sequence is initiated by setting an address A based on a current data access. Flow then proceeds to step S102 where a pattern k is identified as the lowest pattern k for which the $k^{th}$ generation counter is less than the $k^{th}$ observed number flow then proceeds to step S104. At step S104 the address of the next prefetch is determined by incrementing A by the $k^{th}$ address offset. Flow then proceeds to step S106 where a prefetch is issued for data at address A. Flow then proceeds to step S108 where the $k^{th}$ generation counter is incremented. Flow then proceeds to step S110, where the generation counters for patterns 1 to k−1 are reset. Flow then returns to step S102.

Figure 7A:
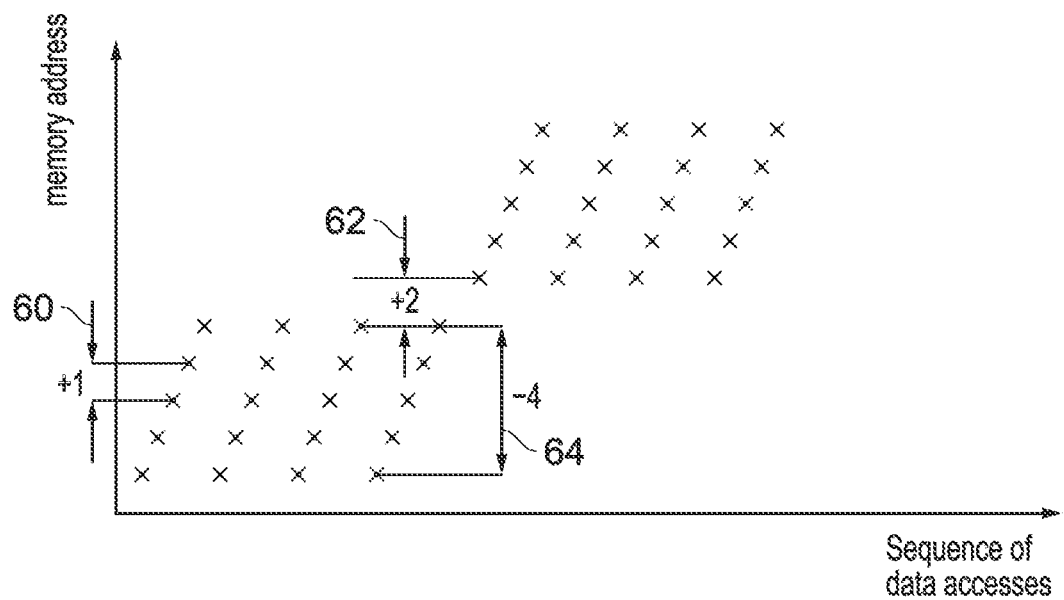
FIG. 7a schematically illustrates a sequence of memory addresses accessed according to some example configurations.
Figure 7B:
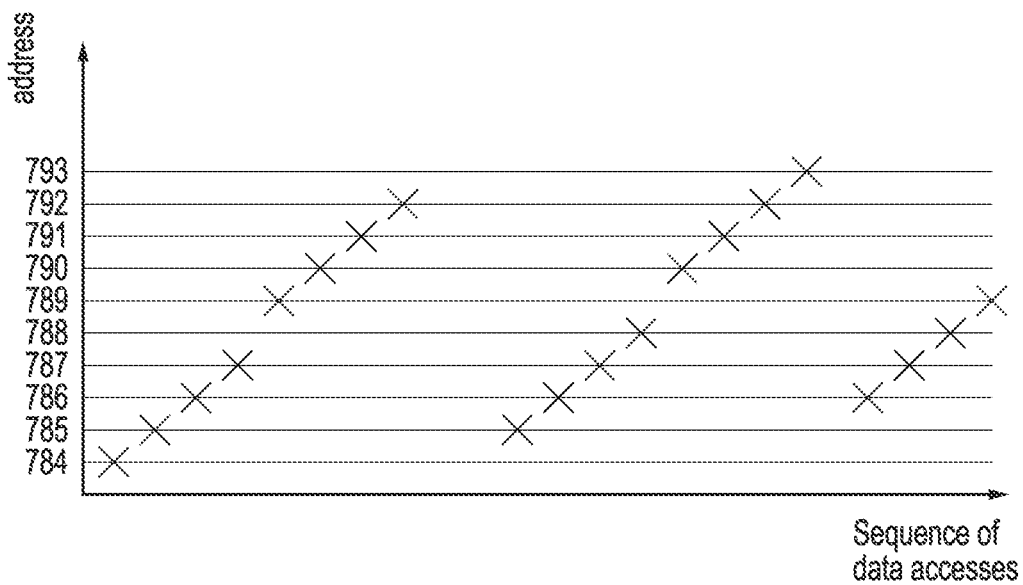
FIG. 7b schematically illustrates a sequence of memory addresses accessed according to some example configurations.

FIG. 7a schematically illustrates memory addresses which are accessed for a sequence of data accesses. The sequence of data accesses is shown with sequential accesses in sequential positions along the x axis. The sequence of data accesses corresponds to the temporal order in which data accesses are made. However, the temporal difference between sequential data accesses can vary between different pairs of sequential data accesses. Hence, there is a monotonic and non-linear relationship between the position of sequential data accesses on the x axis and the temporal ordering of the data access. The y axis shows the addresses accessed by the sequence of data accesses. The data accesses can be seen as falling into different groups. The data accesses are divided into groups of five sequential data accesses, each access separated from a previous access by a single byte offset 60. Groups one to four of the five sequential data accesses and groups five to eight of the five sequential data accesses are separated from the next group of data accesses by an offset of −4 bytes 64. Finally, groups one to four of the five sequential data accesses are separated from groups five to eight of the five sequential data accesses by an offset of two bytes 62. This structure of data accesses corresponds to a nested data access pattern that can benefit from prefetch generation based on a nested prefetch pattern 32. In particular, the nested data access pattern can be described using three patterns of the nested prefetch pattern 32. The first pattern has a first address offset value of 1 and a first observed number value of 4 indicating that 4 occurrences of the first address offset are observed. The second pattern has a second address offset value of −4 and a second observed number value of 3. The third pattern has a third address offset value of 2 and a third observed number of 1 assuming that the observed pattern is the complete pattern. By monitoring the data accesses the training circuitry 36 is able to update the nested prefetch pattern and the prefetch generation circuitry is able to generate prefetches from the nested prefetch pattern. The observed number refer to a number of occurrences of the corresponding address offset. Alternatively, the first to third observed numbers could be implemented as counters indicative of a number of occurrences of addresses separated by the corresponding address offset, in which case, the first, second and third observed numbers would take values 5, 4 and 2 respectively. FIG. 7b schematically illustrates a second sequence of memory addresses that are accessed according to a sequence of data accesses. In this case the data accesses can be described using three patterns of the nested prefetch pattern. The first pattern has first address offset value equal to 1 byte and first observed number equal to 3. The second pattern has second address offset value equal to 2 bytes and second observed number equal to 1. The third pattern has third address offset equal to −7 bytes and a second observed number equal to 2 based on the observed portion of the data access pattern. It would be understood by the person of ordinary skill in the art that the nested prefetch pattern 32 can store any number of patterns with any offset values.

Figure 8:
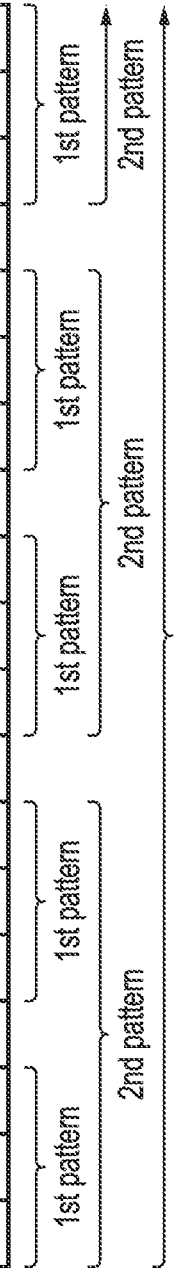
FIG. 8 schematically illustrates a sequence of counters according to some example configurations.

FIG. 8 schematically illustrates the values of address offsets, counter values and observed numbers generated by the training circuitry 36 in accordance with the data access pattern observed in FIG. 7b. Initially each counter is set to a null value. This value may be a specific value indicative that the counter is not in use, or it may be a value indicative that the value of the counter is zero. For illustrative purposes no value has been entered for counters with a null value. The counter values are populated for the data access pattern shown in FIG. 7b with reference to the steps set out in the logical flow diagram of FIG. 5. Initially it is assumed, for column 82, that previous access to address 784 has been stored as a previous access in step S50. The current address for column 82 is address 785 which is detected as a new access at step S52. The address difference determined at step S54 is equal to 1. At step S56 it is determined there are no stored patterns. Hence flow proceeds to step S66 where the first address offset is set to the address difference 1. Flow then proceeds to step S68 where the first counter value is set to 1 to indicate the occurrence of the first address offset. This completes the training process regarding the address 785.

Column 84 is generated as a result of receipt of the next address. In step S50 the address 785 is stored as the previous address. At step S52, a new address 786 is received as the current address. Flow then proceeds to step S54 where an address difference of 1 is determined between the previous address 785 and the new address 786. As there are stored patterns, flow proceeds to step S58 where it is determined that patterns 1 to 3 correspond to not learned patterns. In some alternative implementations only valid patterns for which the observed number is set are considered not learned patterns, thereby avoiding the need to consider the invalid patterns further. If the prefetch generation circuitry 30 was adapted to store further patterns then these would also be determined to be not learned patterns. For conciseness, only patterns 1 to 3 will be referred to in this example. Flow then proceeds to step S60 where it is determined that the nested prefetch pattern contains not learned patterns and at step S62 that the lowest not learned pattern is the first pattern. At step S64 it is determined that the address difference is equal to the first address offset, hence, flow proceeds to step S72 where the first counter value is modified to indicate the occurrence of the first address offset. In particular, the first counter value is incremented to 2. As there are no lower numbered counter values than the first counter value the training process regarding address 786 is complete.

Column 86 is generated as a result of receipt of the next address. In step S50 the address 786 is stored as the previous address. At step S52, a new address 787 is received as the current address. Flow then proceeds to step S54 where an address difference of 1 is determined between the previous address 786 and the new address 787. As there are stored patterns, flow proceeds to step S58 where it is determined that patterns 1 to 3 correspond to not learned patterns. Flow then proceeds to step S60 where it is determined that the nested prefetch pattern contains not learned patterns and at step S62 that the lowest not learned pattern is the first pattern. At step S64 it is determined that the address difference is equal to the first address offset, hence, flow proceeds to step S72 where the first counter value is modified to indicate the occurrence of the first address offset. In particular, the first counter value is incremented to 3. As there are no lower numbered counter values than the first counter value the training process regarding address 787 is complete.

Column 88 is generated as a result of receipt of the next address. In step S50 the address 787 is stored as the previous address. Flow then proceeds to step S52 where a new access to address 789 is detected. Flow then proceeds to step S54 where an address difference of 2 is determined between the previous address 787 and the new address 789. As there are stored patterns, flow proceeds to step S58 where it is determined that patterns 1 to 3 correspond to not learned patterns. Flow then proceeds to step S60 where it is determined that the nested prefetch pattern contains not learned patterns and at step S62 that the lowest not learned pattern is the first pattern. At step S64 it is determined that the address difference is different to the first address offset, hence, flow proceeds to step S76 where it is determined that the first pattern is not the last pattern in the table and flow proceeds to step S78 where it is determined that the second counter value is not set. Flow proceeds to step S80 where the second address offset is set to the address difference. Flow then proceeds to step S82 where the second counter value is set to 1 to indicate the occurrence of the second address offset then, at step S84, the first observed number is set to the first counter value, i.e., it is set to three. Finally, at step S86 the first counter value is reset before flow returns to step S50 and the training process regarding address 787 is complete.

Columns 90 to 94 are generated through the process described with reference to columns 82 to 86 in response to new current addresses 790, 791, and 792. Column 96 is generated in response to receipt of address 785. At step S50 the address 792 is stored as the previous address. Flow then proceeds to step S52 where a new access to address 785 is detected. Flow then proceeds to step S54 where an address difference of −7 is determined between the previous address 785 and the new address 792. As there are stored patterns, flow proceeds to step S58 where it is determined that, because the first observed number is equal to the first counter value, the first observed pattern is a learned pattern and the second and third patterns correspond to not learned patterns. Flow then proceeds to step S60 where it is determined that the nested prefetch pattern contains not learned patterns and at step S62 that the lowest not learned pattern is the second pattern. At step S64 it is determined that the address difference of −7 is different to the second address offset of 2, hence flow proceeds to step S76 where it is determined that the second pattern is not the last pattern in the table and flow proceeds to step S78 where it is determined that the third counter value is not set. Flow proceeds to step S80 where the third address offset is set to the address difference of −7. Flow then proceeds to step S82 where the third counter value is set to 1 to indicate the occurrence of the third address offset then, at step S84, the second observed number is set to the second counter value, i.e., it is set to 1. Finally at step S86 the first counter value and the second counter value are reset before flow returns to step S50 and the training process regarding address 787 is complete.

As illustrated in FIG. 7b, the observed pattern of offsets repeats starting with the access to address 785. The logic regarding the generation of the remaining columns follows the steps already described with reference to columns 82-96. In this way the nested prefetch pattern is able to build up a picture of the nested data access pattern which can be used, as previously described, in the generation of prefetches in parallel to the generation (updating) of the nested prefetch pattern itself by the training circuitry.

In brief overall summary the invention provides a data processing apparatus and a data processing method for generating prefetches of data for use during execution of instructions by processing circuitry. The prefetches that are generated are based on a nested prefetch pattern. The nested prefetch pattern comprises a first pattern and a second pattern. The first pattern is defined by a first address offset between sequentially accessed addresses and a first observed number of the sequentially accessed addresses separated by the first address offset. The second pattern is defined by a second address offset between sequential iterations of the first pattern and a second observed number of the sequential iterations of the first pattern separated by the second address offset.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. A data processing apparatus comprising:
prefetch generation circuitry to generate prefetches of data for use during execution of instructions by processing circuitry, wherein the prefetch generation circuitry is adapted to generate the prefetches based on stored data defining a nested prefetch pattern, the stored data comprising information identifying:
a first pattern defined by a first address offset between sequentially accessed addresses and a first observed number of the sequentially accessed addresses separated by the first address offset; and
a second pattern defined by a second address offset and a second observed number, wherein the second address offset defines an address difference between occurrences of the first pattern, and wherein the second observed number defines how many times the first pattern separated by the second address offset is repeated.

2. The data processing apparatus of claim 1, wherein:
the prefetch generation circuitry is adapted to, when generating prefetches according to the second pattern, sequentially generate groups of prefetches, each group of prefetches generated according to the first pattern; and
for each sequential pair of groups of prefetches comprising a sequentially first group of prefetches and a sequentially second group of prefetches, a sequentially final prefetch address of the sequentially first group of prefetches is separated from a sequentially first prefetch address of the sequentially second prefetch group by the second address offset.

3. The data processing apparatus of claim 1, wherein:
the nested prefetch pattern comprises a plurality of patterns;
the second pattern is one of the plurality of patterns; and
an $N^{th}$ pattern of the plurality of patterns is defined by an $N^{th}$ address offset between sequential iterations of an $(N-1)^{th}$ pattern of the plurality of patterns, and an $N^{th}$ observed number of the sequential iterations of the $(N-1)^{th}$ pattern separated by the $N^{th}$ address offset.

4. The data processing apparatus of claim 3, wherein the prefetch generation circuitry is adapted to recursively, when generating prefetches according to the $N^{th}$ pattern:
sequentially generate groups of the $(N-1)^{th}$ pattern of prefetches, each of the groups of the $(N-1)^{th}$ pattern of prefetches generated according to the $(N-1)^{th}$ pattern; and
for each sequential pair of groups of the $(N-1)^{th}$ pattern of prefetches comprising a sequentially first group of the $(N-1)^{th}$ pattern of prefetches and a sequentially second group of the $(N-1)^{th}$ pattern of prefetches, a sequentially final prefetch of the sequentially first group of the $(N-1)^{th}$ pattern of prefetches is separated from a sequentially first prefetch of the sequentially second group of the $(N-1)^{th}$ pattern of prefetches by the $N^{th}$ address offset.

5. The data processing apparatus of claim 3, further comprising training circuitry adapted to, starting from the first pattern, update each pattern of the nested prefetch pattern based on an observed sequence of address offsets between sequential memory accesses.

6. The data processing apparatus of claim 5, wherein:
the nested prefetch pattern comprises P patterns; and
the nested prefetch pattern encodes status data indicating a training portion of the nested prefetch pattern and a learned portion of the nested prefetch pattern, the training portion comprising the $P^{th}$ pattern of the plurality of nested patterns, and the learned portion comprising patterns 1 to P−1 of the nested prefetch pattern.

7. The data processing apparatus of claim 6, wherein the status data is encoded in a plurality of observed numbers and a plurality of counter values, and
the plurality of observed numbers comprises the first observed number, the second observed number, and the $N^{th}$ observed number.

8. The data processing apparatus of claim 7, wherein the prefetch generation circuitry is adapted to in parallel:
learn the training portion based on the observed sequence of address offsets; and
generate prefetches based on the learned portion of the nested prefetch pattern.

9. The data processing apparatus of claim 7, wherein the training circuitry is adapted to, when the training portion is the first pattern:
determine a first address difference between a sequential pair of memory accesses, set the first address offset based on the first address difference, and modify a first counter value of the plurality of counter values to indicate an occurrence of the first address difference.

10. The data processing apparatus of claim 9, wherein the training circuitry is adapted to, when the training portion is the first pattern:
determine a second address difference between a second sequential pair of memory accesses;
when the second address difference is equal to the first address offset, modify the first counter value to indicate the occurrence of the second address difference; and
when the second address difference is different to the first address offset to perform a first pattern update procedure comprising resetting the first counter value.

11. The data processing apparatus of claim 10, wherein the first pattern update procedure further comprises:
prior to resetting the first counter value, setting the first observed number of the sequentially accessed addresses to the first counter value;
modifying a second counter value of the plurality of counter values to indicate an occurrence of the second address difference;
modifying the status data to indicate that the first pattern belongs to the learned portion; and
setting the second address offset based on the second address difference.

12. The data processing apparatus of claim 10, wherein the first pattern update procedure further comprises:
determining a third address difference between a third sequential pair of memory accesses;
when the third address difference is equal to the first address offset, modifying the first counter value to indicate the occurrence of the third address difference; and when the third address difference is different to the first address offset, setting the first address offset to the third address difference, resetting the plurality of observed numbers, resetting the plurality of observed counter values, modifying the status data to indicate that the first pattern is the training portion, and modifying the first counter value to indicate the occurrence of the third address difference.

13. The data processing apparatus of claim 7, wherein the training circuitry further comprises an $N^{th}$ counter value of the plurality of counter values indicative of a number of occurrences of the $N^{th}$ address offset.

14. The data processing apparatus of claim 13, wherein the training circuitry is adapted to, when the training portion comprises the $N^{th}$ pattern,
determine a fourth address difference between a sequentially final memory access of the $(N-1)^{th}$ pattern and a sequentially next memory access; and
when the fourth address difference is equal to the $N^{th}$ address offset, modify the $N^{th}$ counter value to indicate an occurrence of the fourth address difference.

15. The data processing apparatus of claim 14, wherein the training circuitry is adapted to, when the training portion comprises the $N^{th}$ pattern and when the $N^{th}$ offset is different to the fourth address perform an $N^{th}$ pattern update procedure comprising:
setting the $N^{th}$ observed number to the $N^{th}$ counter value; and
resetting the $N^{th}$ counter value.

16. The data processing apparatus of claim 15, wherein:
the training circuitry is adapted to store $N_{max}$ patterns; and
the $N^{th}$ pattern update procedure further comprises, when $N<N_{max}$:
setting an $(N+1)^{th}$ address offset based on the fourth address difference;
modifying the status data to indicate that the $N^{th}$ pattern belongs to the learned portion; and
setting an $(N+1)^{th}$ counter value of the plurality of counter values to indicate an occurrence of the fourth address difference.

17. The data processing apparatus of claim 16, wherein the $N^{th}$ pattern update procedure further comprises:
determining a fifth address difference between the sequentially next memory access and a further sequentially next memory access;
when the $N^{th}$ offset is different to the fourth address difference and the fifth address difference is different to the first address difference, setting the first address offset to the fifth address difference, resetting the plurality of observed numbers, resetting the plurality of observed counter values, modifying the status data to indicate that the first pattern is the training portion, and modifying the first counter value to indicate the occurrence of the fifth address difference.

18. The data processing apparatus of claim 6, wherein the training circuitry is adapted to, when the training portion is the $N^{th}$ pattern and when the observed sequence of address offsets between sequential memory accesses deviates from a $M^{th}$ pattern where M<N, modify the status data to indicate that the training portion is the $M^{th}$ pattern.

19. The data processing apparatus of claim 1, further comprising one or more generation counters indicative of a currently issuing prefetch in the nested prefetch pattern.

20. A data processing method comprising:
generating prefetches of data for use during execution of instructions by processing circuitry, wherein the prefetches are based on stored data defining a nested prefetch pattern, the stored data comprising information identifying:
a first pattern defined by a first address offset between sequentially accessed addresses and a first observed number of the sequentially accessed addresses separated by the first address offset; and
a second pattern defined by a second address offset and a second observed number, wherein the second address offset defines an address difference between occurrences of the first pattern, and wherein the second observed number defines how many times the first pattern separated by the second address offset is repeated.

* * * * *